No. 879,587. PATENTED FEB. 18, 1908.
R. R. RICHARDSON.
COATING MACHINE.
APPLICATION FILED JUNE 29, 1907.
11 SHEETS—SHEET 8.
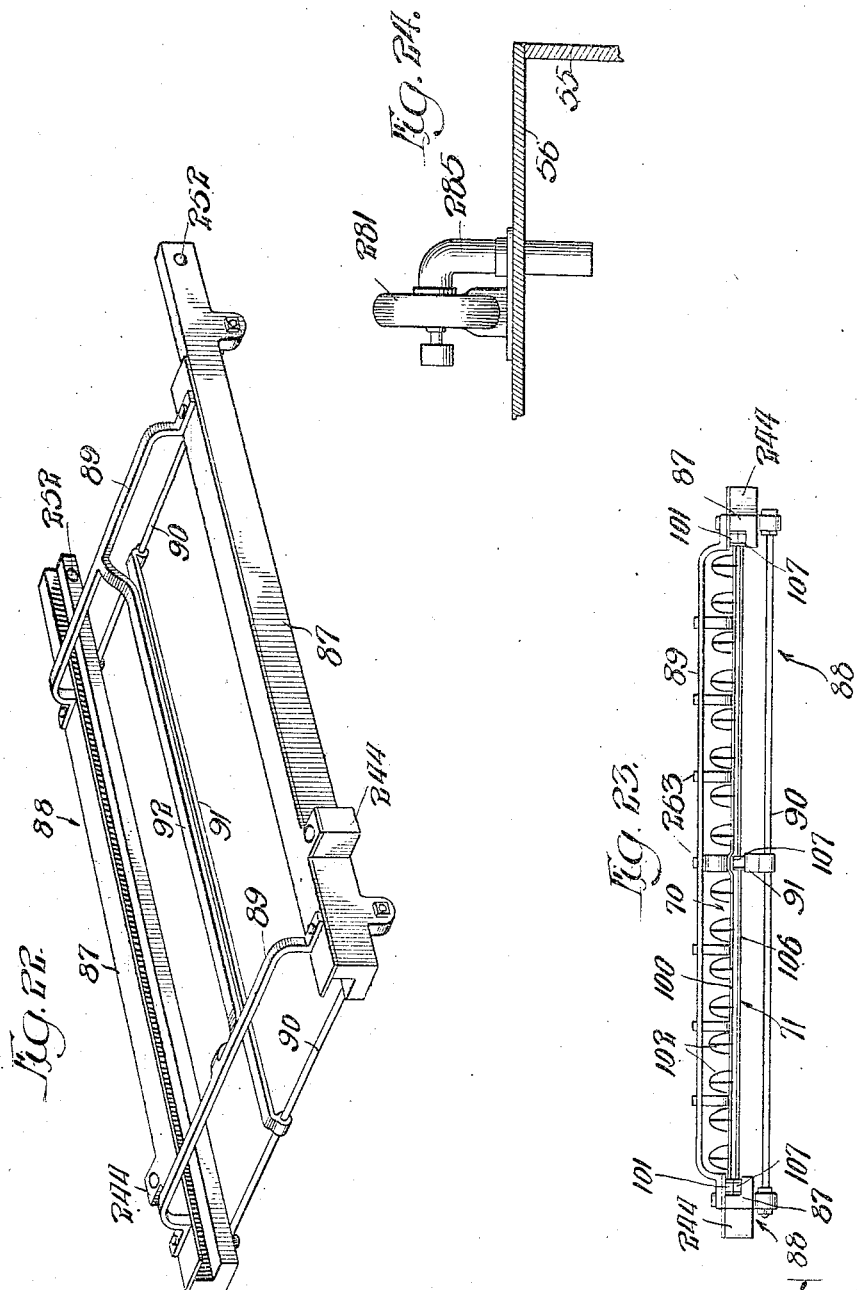
Witnesses:
Inventor
Ralph R. Richardson
by
Poole Brown
Attys.

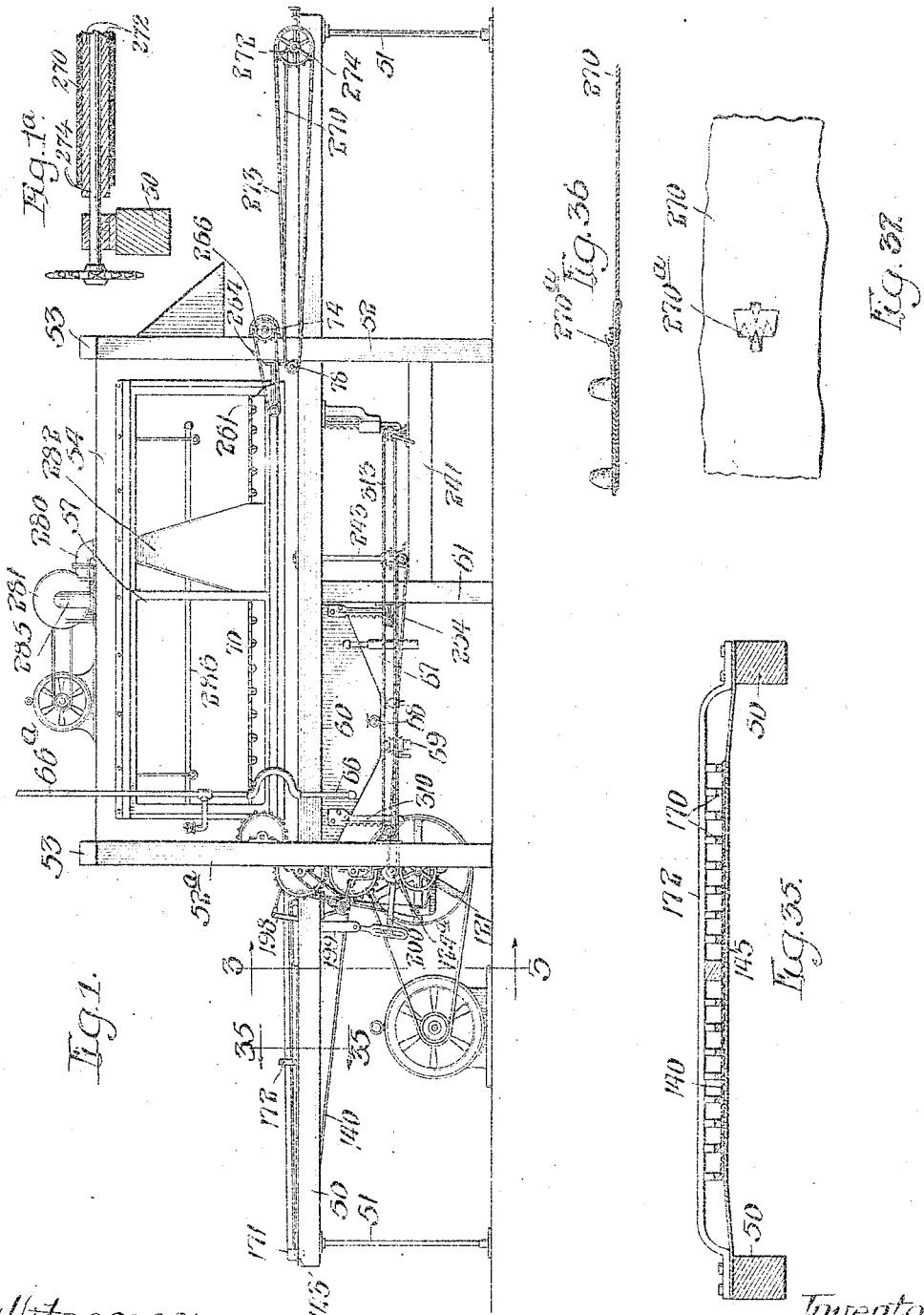

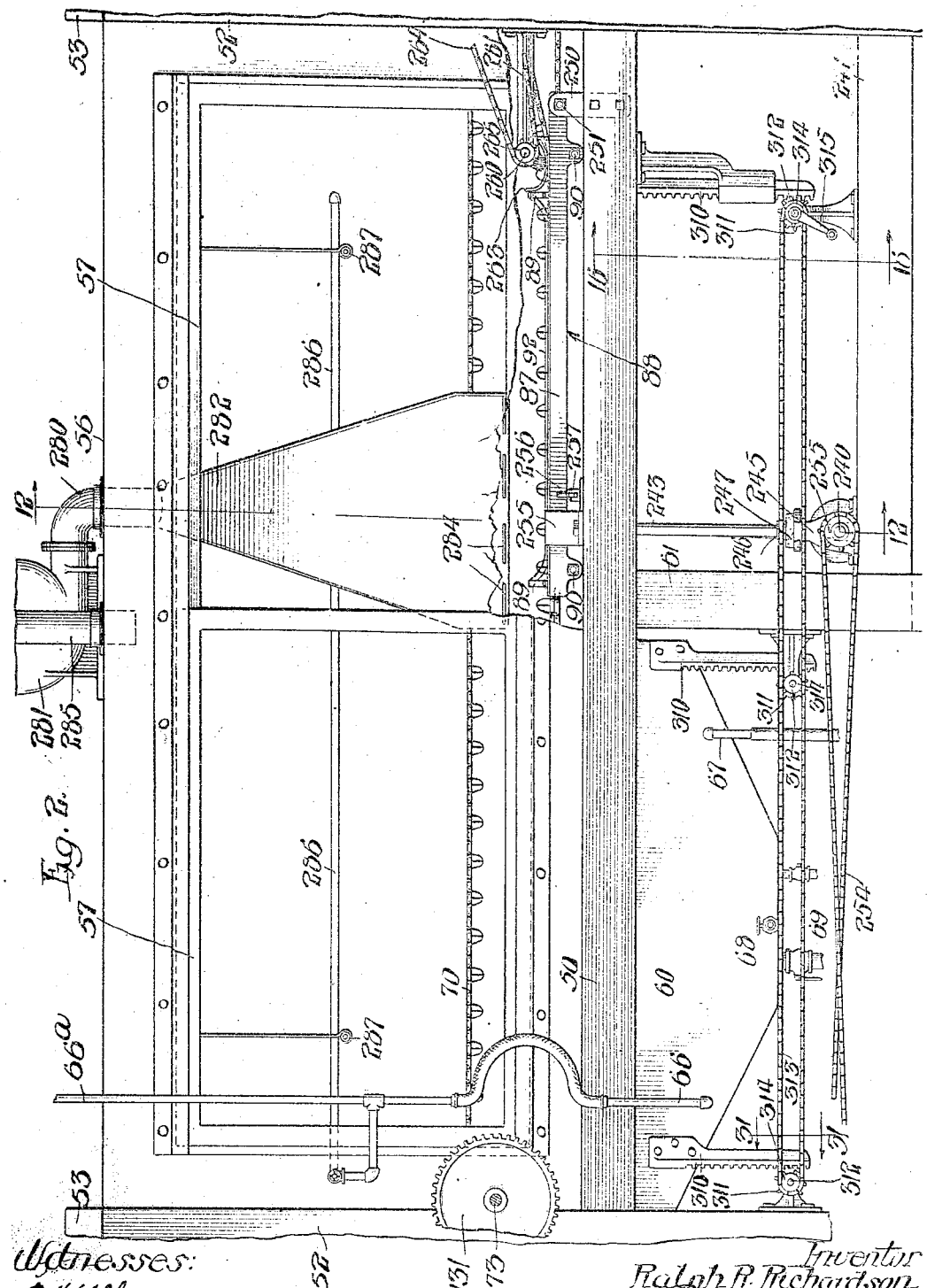

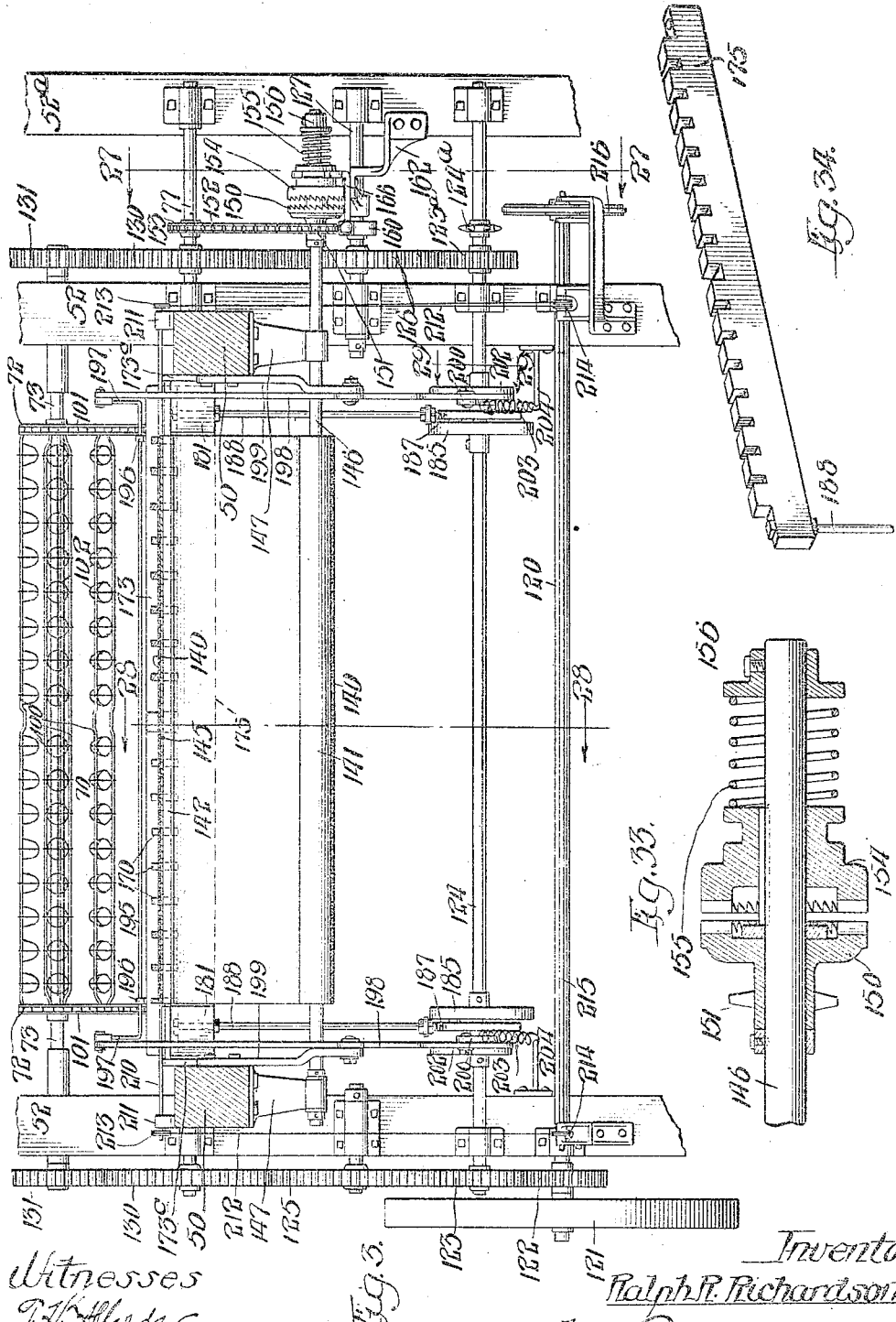

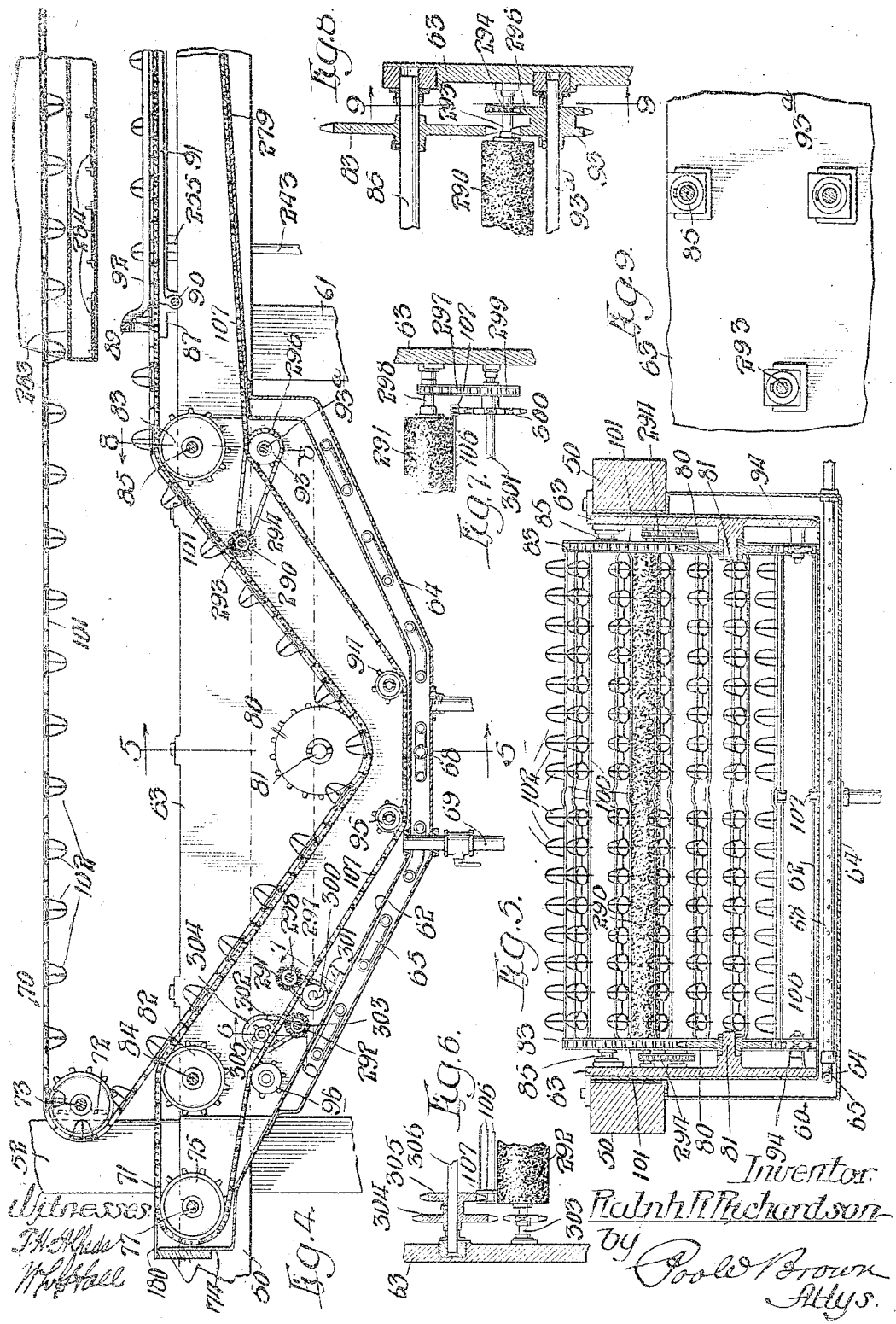

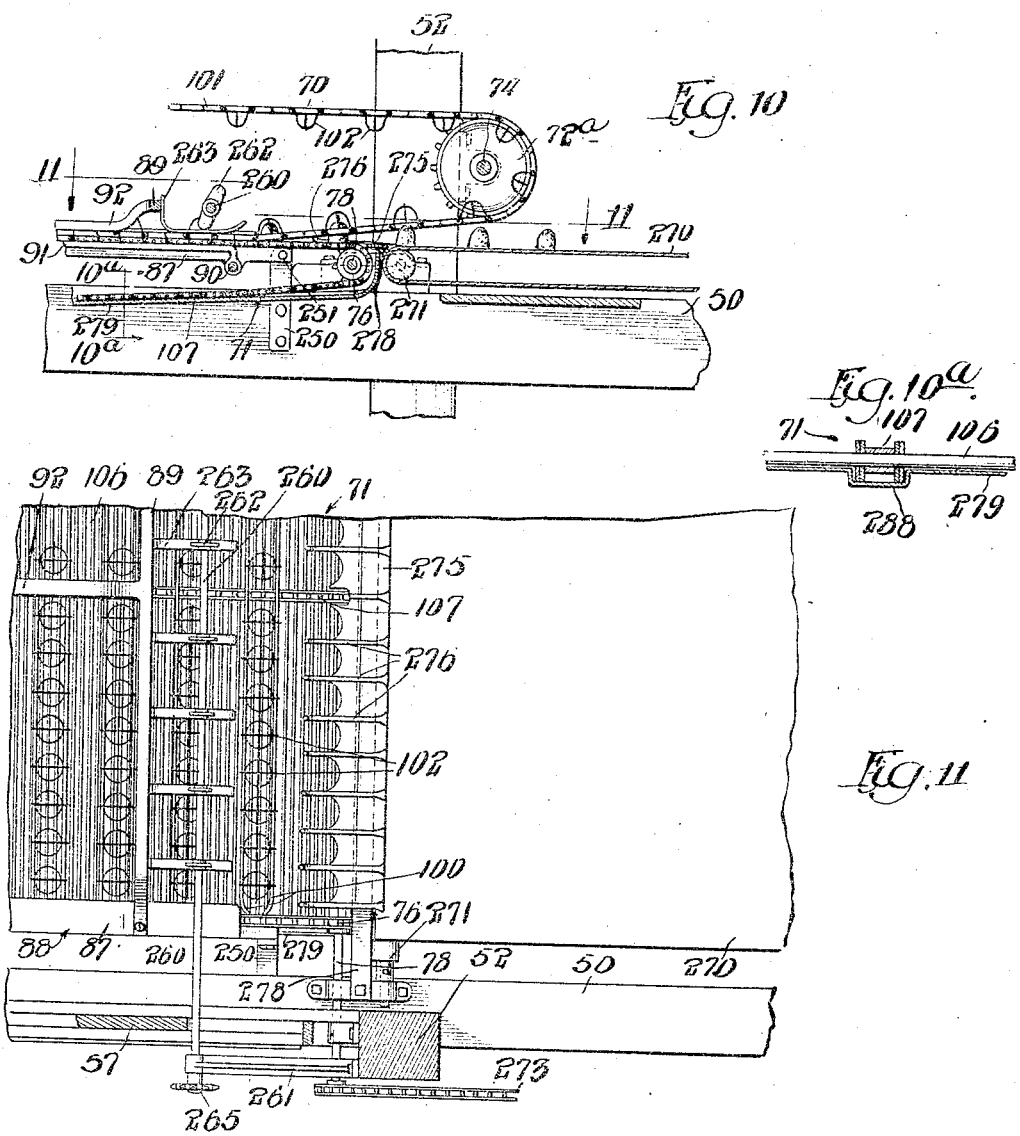

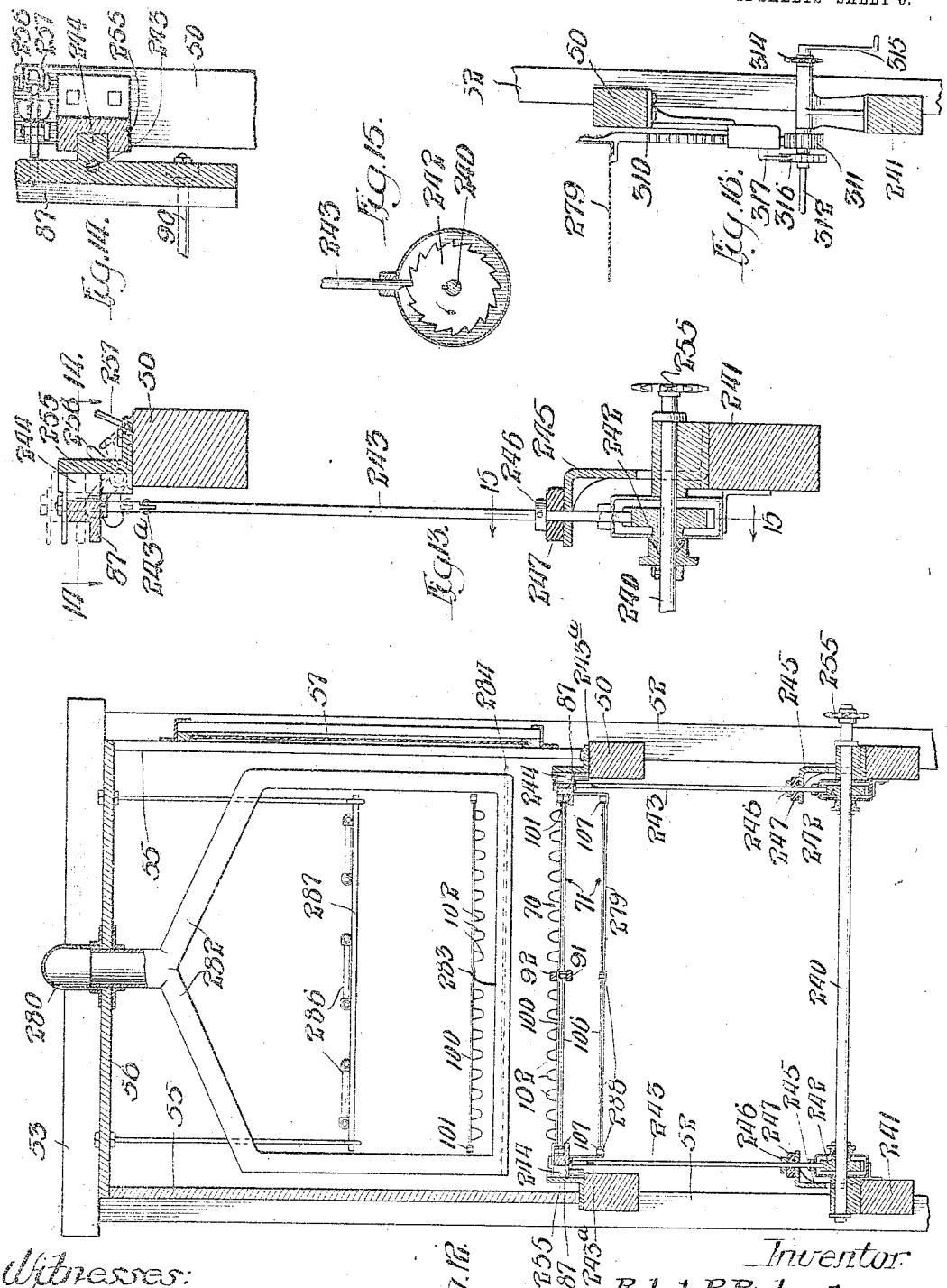

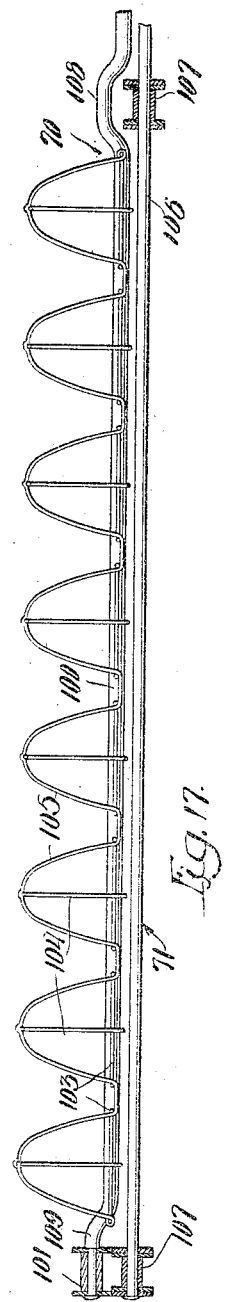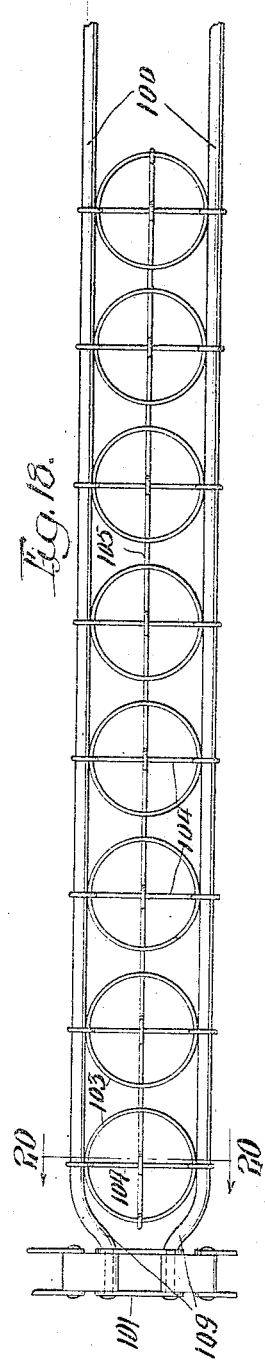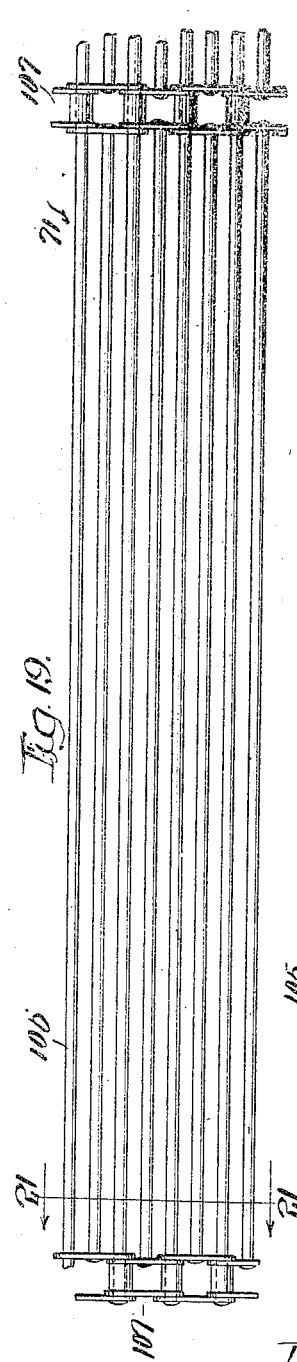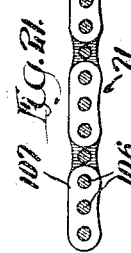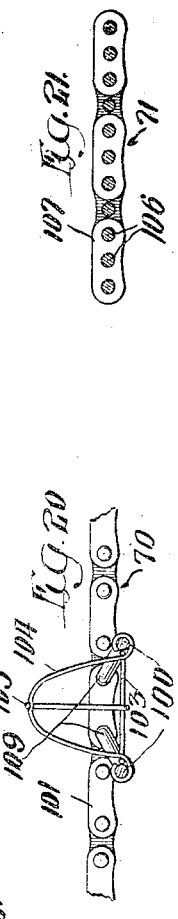

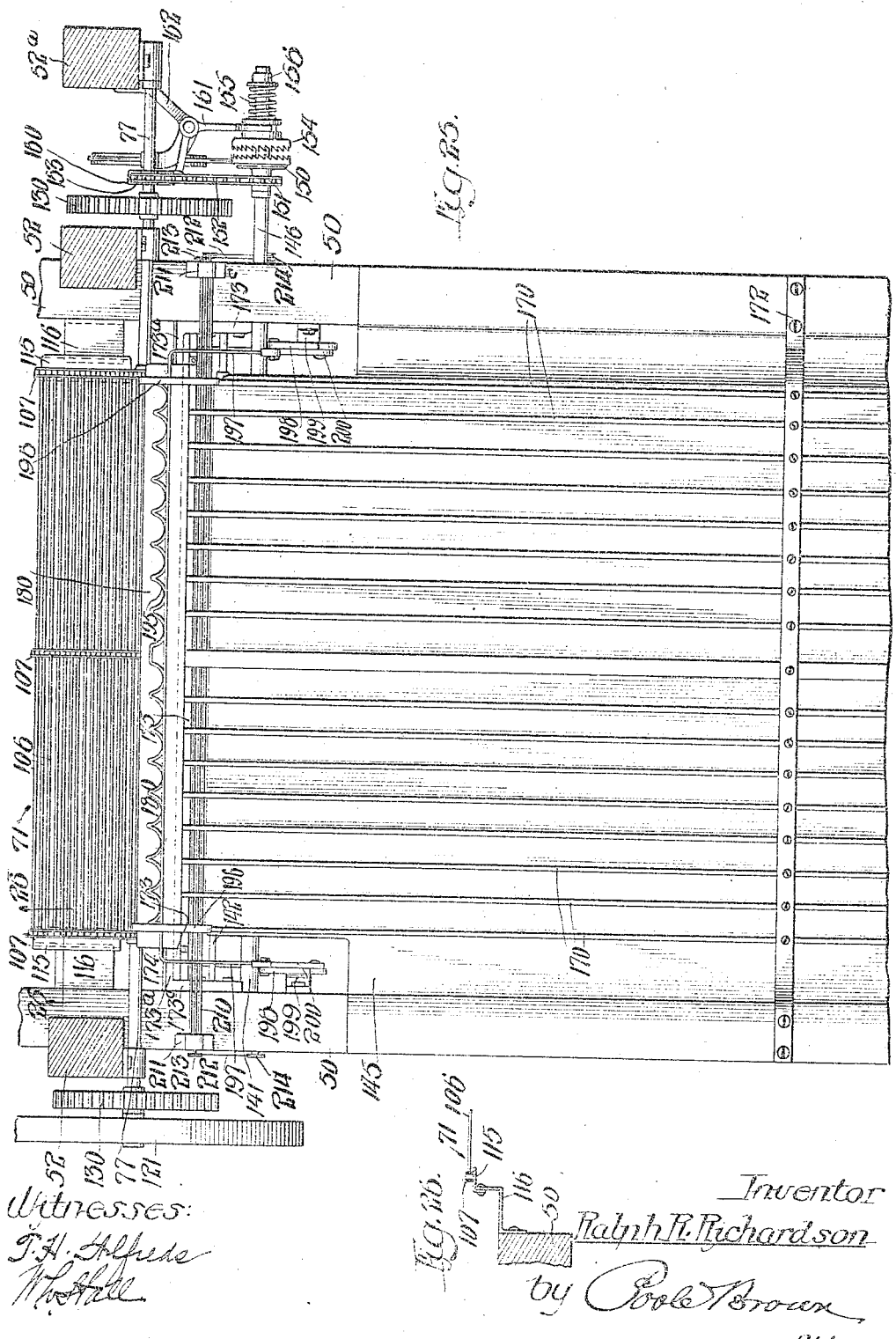

No. 879,587.　　　　　　　　　　　　　　　　PATENTED FEB. 18, 1908.
R. R. RICHARDSON.
COATING MACHINE.
APPLICATION FILED JUNE 29, 1907.
11 SHEETS—SHEET 10.
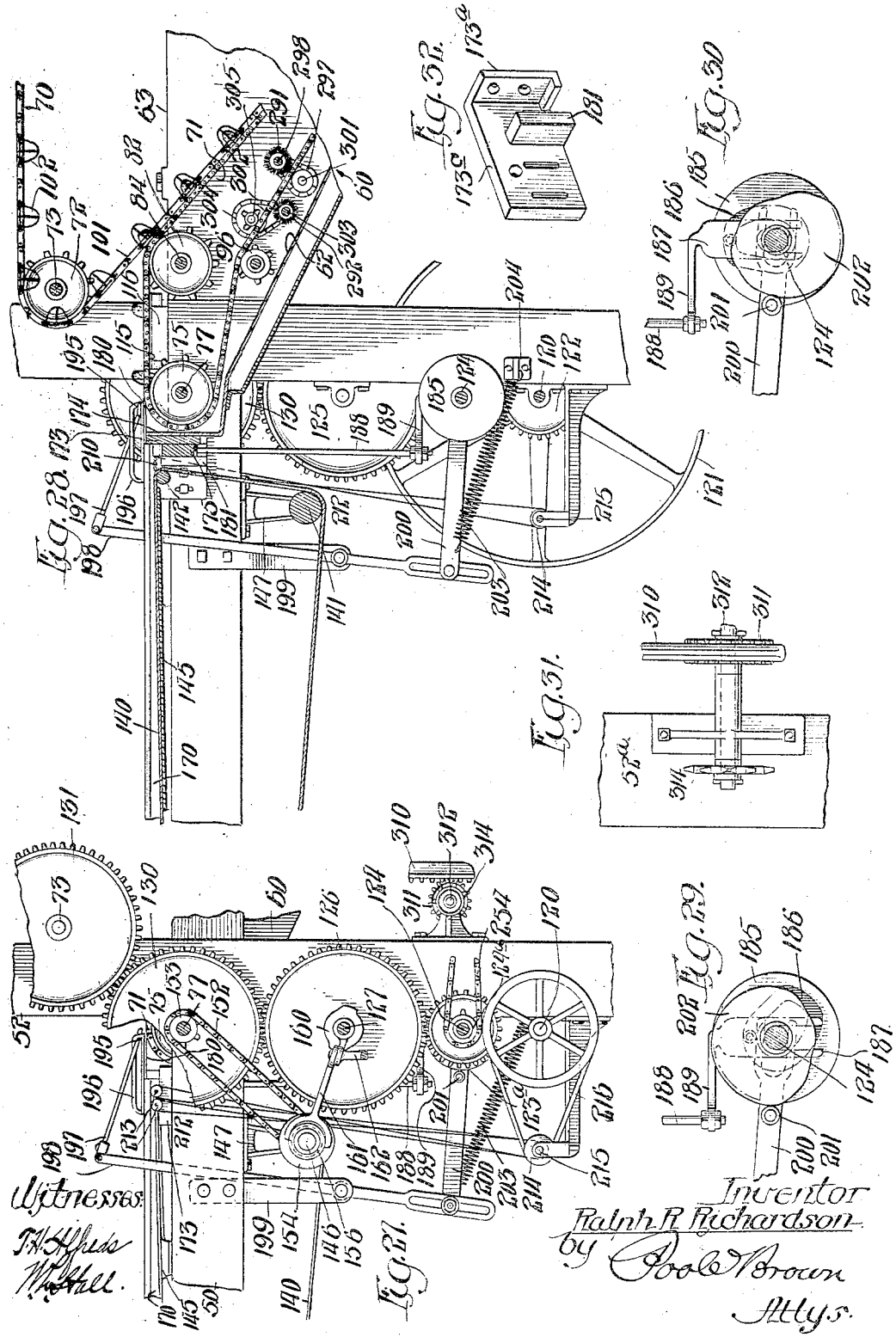

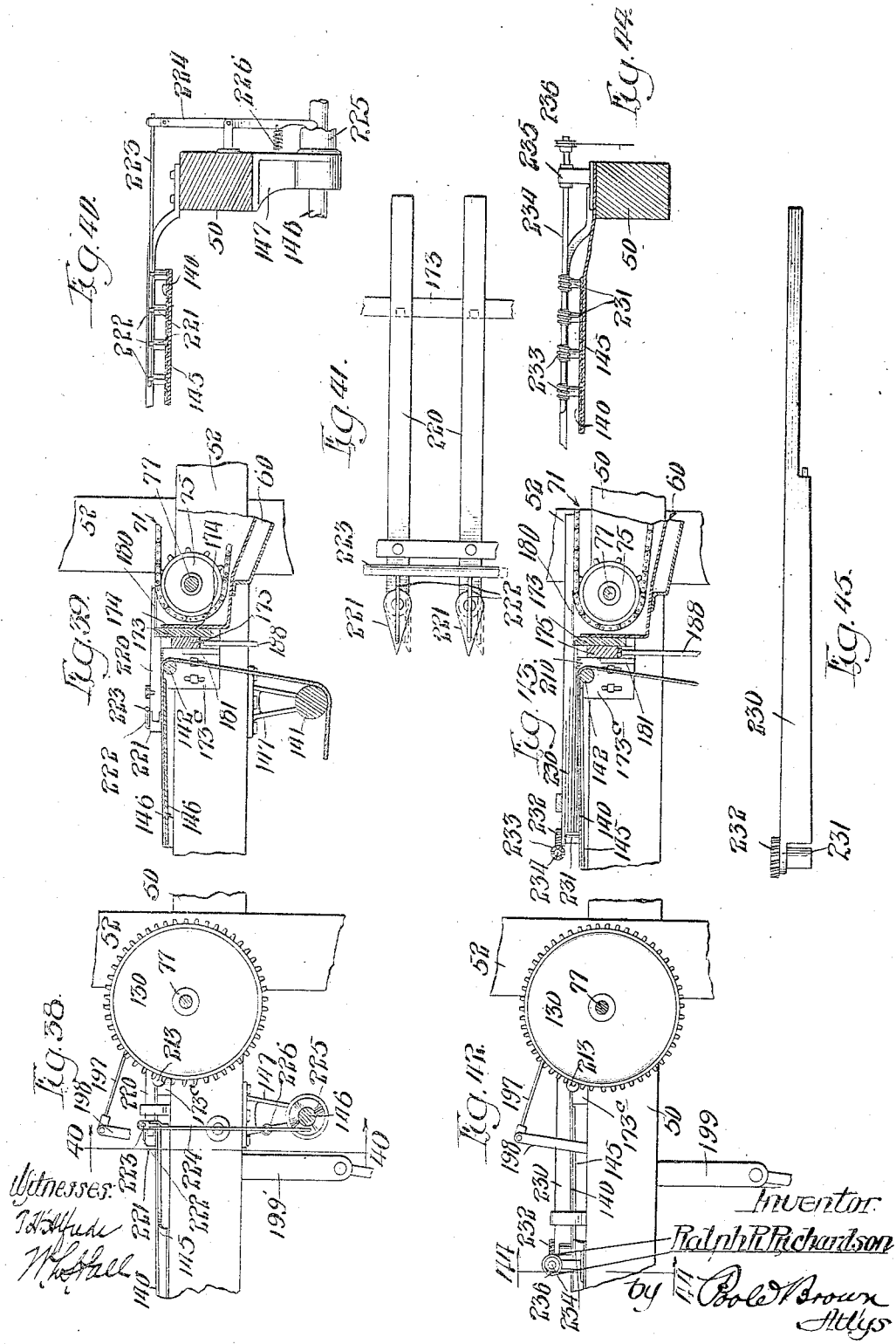

UNITED STATES PATENT OFFICE.

RALPH R. RICHARDSON, OF OTTAWA, ILLINOIS.

COATING-MACHINE.

No. 879,587.　　　Specification of Letters Patent.　　　Patented Feb. 18, 1908.

Application filed June 29, 1907. Serial No. 381,559.

*To all whom it may concern:*

Be it known that I, RALPH R. RICHARDSON, a citizen of the United States, and a resident of Ottawa, in the county of Lasalle and State of Illinois, have invented certain new and useful Improvements in Coating-Machines; and I do hereby declare that the following is a full, clear, and exact description thereof, reference being had to the accompanying drawings, and to the letters of reference marked thereon, which form a part of this specification.

This invention relates to improvements in machines for applying to confections and the like a coating of a different substance as, for instance, applying a chocolate coating to confection centers, and the invention consists in the matters hereinafter set forth and more particularly pointed out in the appended claims.

Among the objects of the invention is to produce a machine by which articles in large quantities may be automatically treated to coat the same, to provide a novel mechanism for dipping the articles in a coating bath, to provide a novel mechanism for feeding the articles to the dipping mechanism and to otherwise improve the construction and operation of machines for this purpose to the end of simplifying and economizing the operation thereof.

In the drawings:—Figure 1 is a side elevation of a machine embodying my invention. Fig. 1ª is a fragmentary section taken through the rear roller of the lower belt of the carrier and its bearings. Fig. 2 is an enlarged side elevation of the central part of the machine. Fig. 3 is a vertical section, taken on line 3—3 of Fig. 1. Fig. 4 is a detail longitudinal section of the central part of the machine showing the reservoir for the liquid coating bath and the carrier mechanism for carrying the articles to be coated therethrough. Fig. 5 is a vertical section, taken on line 5—5 of Fig. 4. Figs. 6, 7 and 8 are detail sections, taken on lines 6—6, 7—7 and 8—8, respectively, of Fig. 4. Fig. 9 is a detail section, taken on line 9—9 of Fig. 8. Fig. 10 is a fragmentary central section of the carrying mechanism at the discharge end of the machine, illustrating the manner of discharging the coated articles from said mechanism upon the take-off mechanism. Fig. 10ª is a section taken on line 10ª—10ª of Fig. 10. Fig. 11 is a horizontal section taken on line 11—11 of Fig. 10. Fig. 12 is a transverse section taken on line 12—12 of Fig. 2. Fig. 13 is an enlarged view of a portion of the mechanism for shaking the coated articles as they emerge from the bath of liquid coating. Fig. 14 is a section taken on line 14—14 of Fig. 13. Fig. 15 is a section taken on line 15—15 of Fig. 13. Fig. 16 is a section taken on line 16—16 of Fig. 2. Fig. 17 is a detail illustrating the construction of the two members of the dipping carrier. Fig. 18 is a detail of the basket member of said carrier. Fig. 19 is a plan detail of the supporting member of said carrier. Fig. 20 is a section taken on line 20—20 of Fig. 18. Fig. 21 is a section taken on line 21—21 of Fig. 19. Fig. 22 is a perspective view of the shaker frame by which the coated articles are shaken to rid the same of excess liquid coating. Fig. 23 is an end view of said frame showing the supporting and basket carriers therein. Fig. 24 is a detail illustrating the blower employed for removing excess coating from the coated articles. Fig. 25 is a plan view of the feeding mechanism showing the adjacent end of the lower carrier belt which receives the articles from the feeding mechanism. Fig. 26 is a section taken on line 26—26 of Fig. 25. Fig. 27 is a vertical section taken on line 27—27 of Fig. 3. Fig. 28 is a vertical section taken on line 28—28 of Fig. 3. Figs. 29 and 30 are detail sections taken on line 29—29 of Fig. 3, showing the parts in two different positions. Fig. 31 is a fragmentary detail as seen from line 31—31 of Fig. 2. Fig. 32 is a detail of the feeding mechanism hereinafter to be described. Fig. 33 is a section of the clutch device for intermittently connecting the feed belt of the feeding mechanism with the power. Fig. 34 is a perspective view of the lift bar for raising the articles from the feed belt to the level of the lower carrier belt. Fig. 35 is an enlarged section taken on line 35—35 of Fig. 1. Fig. 36 is a fragmentary vertical section of the take-off belt. Fig. 37 is a fragmentary plan view thereof. Fig. 38 is a detail illustrating a modified construction of the feed mechanism. Fig. 39 is a section taken in a plane parallel to the plane of the elevation of Fig. 38. Fig. 40 is a transverse section taken on line 40—40 of Fig. 38. Fig. 41 is a top plan view of a portion of the guide bars of the feeding mechanism illustrated in Figs. 38 to 40. Fig. 42 illustrates another modification of the feeding mechanism. Fig. 43 is a vertical section taken in a plane parallel to the plane of the elevation of Fig. 42. Fig. 44 is a transverse section taken on line 44—44 of Fig. 42. Fig. 45 is a detail of one of the guides and guide bars employed in the feeding mechanism shown in Figs. 42 to 44.

The machine herein shown as embodying an approved form of my invention embraces, in general terms, a reservoir for the liquid coating bath, a suitable carrier upon which the articles to be coated are fed and by which they are carried through the coating bath, a feeding mechanism at the receiving end of the machine for arranging the articles to be coated in an orderly manner on the carrier, and a take-off mechanism located at the discharge end of the machine upon which the articles are discharged from the carrier after they have passed through the bath and received a coating. The carrier comprises relatively wide upper and lower endless belts, the adjacent laps of which travel in parallel relation to each other through the coating bath, the said belts being so constructed as to provide between them spaces which receive and hold the articles to be coated while they are passing through the bath. The upper belt of the carrier is separated from the lower belt thereof at the delivery end of the machine and the articles are fed upon said lower belt by suitable feeding mechanism so constructed and arranged that the articles to be coated are fed upon the lower belt or member of the carrier in rows transverse to the direction of movement of the carrier, with the articles in each row separated a suitable distance from each other, whereby they are brought longitudinally and transversely into line with the spaces between the carrier belts made to receive them when the adjacent laps of the belts are brought into parallelism on the feed side of the coating receptacle. Thus the articles are carried through the bath and delivered to a suitable take-off device at the discharge end of the machine in the same position as they were received by the carrier, and the arrangement of the parts is such that the coated articles may be delivered to the take-off mechanism in like parallel lines in which they were delivered by the feeding mechanism. The space above and partially surrounding the carriers is inclosed by a suitable housing and means are provided for maintaining the temperature of the housing as well as the temperature of the coating bath at a selected or predetermined point and one at which the coating bath may be most efficiently applied to and maintained on the articles until they are discharged from the machine.

The foregoing general description is presented in order that the description of the details may be more readily grasped, and is not intended to impose any limitations on the scope or application of the invention.

Referring now to the detail construction of the machine herein illustrated, the same is made as follows.

The frame of the machine embraces two horizontal rails 50, 50 extending from end to end of the machine and supported at their outer ends by standards 51, 51 and central vertical standards or posts 52, 52 arranged, as shown, at the corners of a rectangle by which said rails are supported. Said posts extend above the horizontal rails 50 and are connected at their upper ends by cross-beams 53. The space between the standards above said rails is inclosed by a housing comprising side walls 54, partial end walls 55 and a top wall 56 (Figs. 1, 2 and 12). The side walls are provided with sliding, glass mounted, doors 57, 57 whereby access may be had to the interior of the housing.

60 designates the upwardly opening reservoir for the coating bath which is located between the front posts 52 of the frame and short, intermediate posts 61 extending downwardly from the side rails. The said reservoir comprises a bottom wall 62 (Fig. 4) which is centrally depressed and side walls 63. The said bottom wall is provided with a jacket 64 in the space between which and said bottom wall are arranged coils of steam pipes 65 connected with steam feed and return pipes 66 and 67, respectively, (Fig. 1). Said space is also provided with a perforated water supply pipe 68 by which water is admitted to the space to temper the coating bath. The reservoir is emptied through a discharge pipe 69.

The carrier by which the articles are fed through the bath comprises upper and lower endless belts 70 and 71, the mounting of which is shown best in Figs. 4 and 10. The upper belt is trained about and driven by sprocket wheels 72, 72ᵃ located at the feeding and discharge ends, respectively, of the machine and fixed on rotative shafts 73, 74 mounted in bearings carried by the front and rear posts 52. The lower belt is likewise trained about sprocket wheels 75, 76 fixed to rotating shafts 77, 78, respectively, mounted in bearings attached to said front and rear posts 52. The lower lap of the upper belt and the upper lap of the lower belt travel parallel and adjacent to each other from the delivery to the discharge end of the machine so as to hold the articles to be coated in baskets or pockets provided on the upper belt, as will hereinafter be described. The said adjacent laps of the belts are, from a point adjacent to the feed end of the machine, deflected downwardly into the coating bath reservoir and thence upwardly to the general level of the take-off mechanism at the discharge end of the machine. For this purpose said adjacent laps of the belts are trained about idlers 80 mounted on short shafts 81 extending inwardly from the side walls of the reservoir, as shown in Figs. 4 and 5, and the upper lap of the lower belt is likewise trained about idlers 82, 83 rotatively mounted on shafts 84, 85, respectively, at the receiving and discharge ends of the bath receptacle. Thus it will be seen that between the idlers 82 and 83 the adjacent laps of the upper and lower belts are held together. The said adjacent laps of the belts are held together, between the rear idler 83 and the discharge end of the machine, by being passed through guide ways or slots in parallel guide bars 87 (Figs. 2, 4, 10, 22 and 23). Said guide bars in the present instance constitute the side members of a vibrating or shaking frame 88 used to shake the excess coating material from the articles being coated after they emerge from the bath reservoir and before they are discharged from the machine, as will hereinafter more fully appear. The guide frame members 87 are connected at their front and rear ends by upper and lower transverse bars 89, 90, and said transverse connecting bars are themselves connected by longitudinally arranged bars 91, 92, respectively. The said longitudinal bars 91, 92 are spaced close together throughout the principal portion of their length to maintain the intermediate portions of the adjacent laps of the belts together (Fig. 23).

The forward driving pulleys 72 of the upper belt are located in rear of the forward driving pulleys 75 of the lower belt, and the upper lap of the lower belt, between the driving pulleys 75 and the idlers 82, is disposed horizontally, as most clearly shown in Fig. 4. It is upon this horizontal part of the upper lap of the lower belt that the articles to be coated are delivered by the feeding mechanism hereinafter to be described. The lower lap of the lower belt is trained about idlers 93, 94, 95 and 96 so arranged that the lower or returning lap of the belt is directed through the lower part of said receptacle back to the feed end of the machine.

The said upper and lower belts of the two-part carrier embrace novel features of construction and are made as follows: The upper belt comprises a plurality of transverse rods 100, 100, best shown in Figs. 17, 18 and 20, which are connected at their ends with the links of sprocket chains 101 (Figs. 18, 20 and 23) that run over the driving and idler wheels therefor. The rods embodied in said upper belt are arranged in pairs spaced at a suitable distance apart. Each pair of rods support a plurality of baskets, indicated as a whole by 102, disposed longitudinally of the said rods, and therefore transversely with respect to the direction of travel of said chain. Said baskets are so constructed that those occupying at any given time the lower lap of the belt open downwardly and are closed at their upper ends. They are herein shown as made of wire, each comprising a ring 103 surrounding the mouth of the basket, and arched wires 104, 105 sprung away from the plane of the belt. The arched wires 104 extend transversely between the rods 100 of each pair and are coiled about said rods and also about the ring to fasten said ring in place. As herein shown, the arched wires 105 for each series of baskets are made of a continuous wire suitably attached at their ends to the end rings 103 and laced over the arched wires 104 and beneath the rings 103 in the manner most clearly shown in Fig. 17.

The lower belt comprises a plurality of uniformly and closely spaced rods 106 that are attached at their ends to the links of sprocket chains 107, 107 designed to run over the driving and idler wheels for said belt (Figs. 19 and 21). In machines where the belts are made of considerable width, one or more intermediate sprocket chains may be incorporated in the lower belt (Figs. 10ᵃ 17 and 23) to support the central part of the belt, and suitable supporting sprocket wheels will be provided at the proper place over which said intermediate chain or chains run.

In order to enable the upper and lower belts to be brought close together notwithstanding the presence of the sprocket chains at the marginal and intermediate parts thereof, the rods 100 of the upper or basket bearing belts are bent outwardly from the plane of the belt in the parts thereof in line with said sprocket chains, as indicated at 108, 109 (Fig. 17).

It will be noted from an inspection of Fig. 4 that as the adjacent laps of the upper and lower belts move rearwardly away from the pulleys 72 and 75 the lower lap of the upper belt gradually approaches and is brought flatwise against or parallel to the upper lap of the lower belt at the rear part of the horizontal or receiving portion thereof between the sprocket wheels 75 and 82 with the baskets or pockets opening downwardly on the lower belt; and that said adjacent laps of the belts travel together in this position until after they leave the guide-grooves in the side bars of the shaking frame 88 before referred to. At the point of emergence from said guide grooves the upper belt diverges or raises from the lower belt (Fig. 10) and is returned over the sprocket wheels 72ᵃ, while the lower belt is returned over the sprocket wheels 76. The horizontal portion of the upper lap of the lower belt is supported at its margins, between the sprocket wheels 75 and 82, by short bars 115 (Figs. 25 and 26) supported from the side frame rails 50 by brackets 116. The articles to be coated are fed in transverse rows on the horizontal or receiving portion of the lower belt and the articles in each row are spaced apart a distance to correspond with the transverse spacing of the baskets on the upper belt. As each row is advanced and the lower lap of the upper belt is gradually moved towards the lower belt until the pockets or baskets close down over the articles on the lower belt and thereby hold said articles confined between the belts while the articles are carried through the coating bath.

Referring now to the means for driving said upper and lower belts of the dipping carrier the same are made as follows: As herein shown said belts are driven from both sides of the machine in order to distribute the driving power uniformly to the belts. 120 designates the main driving shaft which is mounted in bearings in the front posts 52 of the machine. Said shaft is provided at one end with a driving pulley 121 adapted, through the medium of a driving belt, to receive power from a suitable source, as the electric motor shown. Said shaft is provided adjacent to the driving pulley with a pinion 122 that meshes with a gear wheel 123 fixed to one end of a countershaft 124 that extends across the machine and is mounted in suitable bearings fixed with said posts 52, and a post 52ª at the right hand side of the machine. Said pinion 123 and a companion pinion 123ª on said shaft mesh with gears 125, 126, respectively, the former of which constitutes an idler and the latter of which is fixed to a shaft 127 which is rotatively mounted in bearings in the post 52 and the adjacent post 52ª (Fig. 3). The gear wheels 125, 126 mesh with gear wheels 130, 130 fixed to the shaft 77 that carries the lower belt sprocket wheels 75. The gear wheels 130 mesh with gear wheels 131 fixed to the shaft 73 that carries the sprocket wheels of the upper belt of the carrier. Rotation of the main driving shaft therefore imparts, through the countershaft 124, and the gears referred to, opposite rotation to the driving shafts 73 and 77 to drive said belts in the desired direction.

Referring now to the feeding mechanism and the means for operating the same, said parts are shown most clearly in Figs. 1, 3, 25, 27 to 32, both inclusive, 33, 34 and 35 and are made as follows: 140 designates a feed belt that is trained about rollers 141, 142, 143, the two former being located adjacent to the feed end of the machine, as most clearly shown in Fig. 28, and the latter located at the forwardmost end of the machine, as shown in dotted lines in Fig. 1. The horizontal upper lap of the belt between the rollers 142, 143 is supported on a horizontal plate or table 145 which extends between and is attached to the forward part of the horizontal rails 50 of the machine frame (Figs. 25, 28 and 35). The feed roller 141 constitutes the feed belt driving roller and is intermittently rotated to advance the feed belt step by step. The shaft 146 of said feed belt roller 141 is rotatively mounted in bearing hangers 147 depending from the side rails 50 of the machine frame (Fig. 3). Said shaft 146 is intermittently rotated from the lower carrier belt driving shaft 77 through driving mechanism, including a clutch device, which is made as follows: 150 designates a clutch member rotatively mounted on the feed belt driving shaft 146 and provided on its hub with a sprocket wheel 151 through the medium of which and a chain 152 rotative movement is communicated from a sprocket wheel 153 carried by the shaft 77 (Figs. 3, 25, 27 and 33). 154 designates a movable clutch member mounted to slide endwise on said shaft 146 towards and from the clutch member 150 but is non-rotatively fixed thereto by a key, as best shown in Fig. 33. A spring 155 surrounding said shaft is interposed between the clutch member and a fixed collar 156 on the outer end of said shaft. Said spring normally holds the movable clutch member engaged with the stationary clutch member and when said clutch members are so engaged the feed belt is driven from the rotative shaft 77. Said clutch members are disengaged to intermittently arrest the movement of the driving belt through the agency of a cam 160 (Figs. 3, 25 and 27) mounted on the shaft 127, and a bell-crank lever 161 pivoted on a bracket 162 supported from the adjacent post 52ª. Said bell-crank lever is adapted for engagement at one end by said cam and is provided at its other end with a fork which engages a groove in the hub of the sliding clutch member. Thus during each period of advance of the feed belt a row of articles to be coated is delivered transversely across the horizontal portion of the lower carrier belt in position to be covered by one of said series of pockets or baskets as the upper belt is brought flat against the lower belt.

The articles to be coated are laterally spaced on the belt so as to be delivered to the lower belt of the carrier in line with the baskets or the upper belt of said carrier by parallel spacing bars 170 (Figs. 3 and 25) over the belt and supported on transverse bars 171 and 172 extending across the feed belt between the side rails 50. The said spacing bars abut at their rear ends against a vertical plate 173 extending transversely across the machine frame and attached to inwardly extending flanges 173ª of brackets 173ᶜ mounted on the inner faces of the side rails 50 of the frame, as most clearly shown in Figs. 25, 28 and 32.

In the present instance, the upper lap of the feed belt is located below the level of the horizontal receiving portion of the upper lap of the lower carrier belt 71 and means are provided for periodically lifting the articles to be coated from the lower to the higher level and for pushing said articles when so raised upon the receiving portion of said upper lap of the lower belt. The upper margin of the plate 173 is at the level of the receiving portion of said lower carrier belt and said plate constitutes a stop against which the articles are directed by the feeding mechanism and by which their movement is retarded until raised into the influence of the device for pushing them upon the lower carrier belt. The means for raising said articles to the level of the receiving portion of the lower belt of the carrier and for directing the raised articles to said belt are so timed, relatively to the speed of the carrier belts, that the carrier belts are advanced a distance between two adjacent rows of baskets of the upper carrier belt during the time consumed by each operation of the lifting and pushing means, whereby each row of articles to be coated thus delivered to the lower carrier belt is in position to be covered by the next succeeding transverse row of baskets brought against the lower carrier belt.

The means herein shown for transferring the articles from the feed belt to the lower carrier belt, and operating to arrest the feeding movement of the articles to provide for properly spacing them on the carrier belt, are made as follows: The articles to be coated are delivered upon the upper edge or face of a vertically movable lift bar 175 located in front of said stop plate 173, said upper face of the bar being disposed in the general plane of the upper lap of the feed belt. The said articles are raised by said lift bar to the level of the upper edge of the plate 173 and a horizontal bridge plate 180 extending rearwardly from the upper edge of the plate 173 to a position over the horizontal receiving part of the lower carrier belt. The said lift bar 175 has guiding engagement at its ends between the forward face of said transverse plate 173 and inwardly extending lugs 181 on said casting 173°, as shown in Figs. 28 and 32, and is notched on its upper face to receive the rear ends of the spacing bars 170 when in its upper or raised position. The means for actuating said lift bar is made as follows: 185, 185 designate two cam disks fixed to the shaft 124 at the forward end of the machine, one at each side thereof, (Figs. 3, 28, 29 and 30). The said cams 185 are provided on their inner faces with cam grooves 186 that are engaged by the lugs of forked cam blocks 187 which have guiding engagement with said shaft 124. Said blocks are connected with the opposite ends of the lift bar by rods 188 that are attached at their upper ends to the ends of the lift bar and at their lower ends to forwardly extending rigid arms 189 of said cam blocks 187. The cam grooves are of such contour as to raise and lower the lift bar quickly but to hold the same for a suitable dwell in both its upper and lower positions, as will hereinafter more fully appear. The articles thus raised by the lift bar 175 are shifted across the bridge plate 180 to the horizontal receiving portion of the lower carrier belt by means of a pusher, indicated as a whole by 195, (Figs. 3, 25, 27 and 28) which is arranged parallel with the lift bar and reciprocates rearwardly across the upper face of the lift bar and the bridge plate. The pusher is provided with a plurality of recesses or pockets located in line with the spaces between the space bars 170 of the feed belt so as to properly place the articles on the horizontal part of the carrier to be engaged by the baskets of said carrier in the manner before described. The said pusher extends at its ends through two horizontal guide loops 196 and is provided with forwardly directed arms 197 which are hinged to the upper ends of cam actuated bars 198. The said swinging bars 198 are pivoted between their ends to brackets 199, depending from the longitudinal rails of the machine and have pin and slot connection at their lower ends with horizontally reciprocating cam bars 200 that are forked at their inner ends for guiding engagement with the shaft 124. Said cam bars are provided with lugs 201 that engage the periphery of a suitable shaped cam 202 fixed to the shaft 124 at the sides of the cam disk 185. Springs 203 attached at their forward ends to said cam bars 200 and at their rear ends to brackets 204 fixed to the forward posts 52 normally hold the pusher in its retracted position and the cams operate to shift the pusher rearwardly to deposit a row of articles to be coated from the lift bar to the lower carrier belt. Said cams 185 and 202 are so related to each other that the pusher is retracted to a position in front of the lift bar at the time the latter is depressed and is advanced thereover at the time the lift bar is in its uppermost position. In order to bridge the space between the said lift bar and the rearmost portion of the feed belt 140 and thus prevent small, relatively unstable articles such as cream centers from toppling over as they pass from the belt to the lift bar, I have herein shown said space as occupied by a plurality of rotating rods 210 (Figs. 25 and 28) which extend transversely from one horizontal frame rail to the other and are mounted in suitable bearings 211 attached to said rails. The said rods are driven or rotated by means of driving belts 212, 212 trained about pulleys 213, carried by the outer ends of said rods, and about other pulleys 214 that are fixed to a shaft 215 located in front of the main shaft 120, as best shown in Fig. 3. Said shaft 215 is rotated from the shaft 120 by means of a belt 216 trained about pulleys on said shafts, as shown in Fig. 27. In this construction and arrangement, the rods are rotated rapidly and serve to deliver the articles from the belt to the upper face of the lift bar smoothly and without tendency to cause said parts to fall over.

The feeding mechanism for feeding the articles from an intermittently advanced feed belt to a continuously movable carrier may be considerably varied from the disclosure of such structure herein. For instance, instead of employing a stationary stop for the articles to arrest the same prior to their delivery to the carrier, I may employ a movable stop such as illustrated in my copending application, Serial No. 380,413, filed June 24th, 1907.

Instead of employing the spacing bars 170 extending throughout the length of the feed belt, I may provide shorter spacing bars 220, shown in Figs. 38 to 41, inclusive, provided at their forward ends with means for directing the articles into the spaces between said bars. As shown in the figure last mentioned, such directing means consists of horizontally vibrating points 221 which are hinged to the rear ends of said bars. The said vibrating points 221 are connected by short arms 222 with a transversely arranged, reciprocating, actuating rod 223. Said rod extends beyond the side of the frame and is reciprocated through the agency of a swinging lever 224 and a face cam 225 formed on a collar that is fixed to the lower driving roller shaft 146. A spring 226 holds the lower end of said lever 224 against the cam. It will thus be seen that rotation of said cam operates to vibrate the points 221 with the result of arranging the articles that are presented to it by the forward travel of the belts in parallel rows spaced by said bars.

In lieu of the arrangement described, I may employ for the same purpose the construction shown in Figs. 42 to 45, both inclusive. As shown therein 230 designates the spacing bars. Mounted in the forward ends of said guide bars are vertical rollers 231, provided at their upper ends with worm wheels 232. Said worm wheels 232 mesh with worms 233 fixed to a shaft 234 extending transversely across the belt and mounted at its ends in short standards 235 rising from the horizontal frame rails 50. The said shaft 234 is provided at its outer end with a belt pulley 236 through the medium of which it may be rotated from any suitable adjacent rotating part of the machine.

Referring now to the mechanism for shaking or vibrating the frame 88 through which the carrier belts pass at the discharge end of the machine, whereby excess coating material is shaken or dislodged from the articles emerging from the coating bath, this construction is shown most clearly in Figs. 1, 2, 12, 13, 14 and 15 and is made as follows: 240 designates a rotative shaft extending transversely of the machine and mounted in bearings carried by horizontal beams 241 of the frame. Affixed to said shaft at each end thereof is a ratchet wheel 242. Said ratchet wheels are engaged by the lower ends of reciprocating rods 243 which are attached at their upper ends to lugs 244 on the forward end of the shaking frame. The said rods 243 extend through suitable guides 245 above said ratchet wheel and are provided with fixed collars 246 that are arrested by buffers 247 carried by said guide brackets 245. The said shaking frame is hinged at its rear end to short standards 250 (Figs. 2 and 10), rising from the side rails of the frame, by means of a transverse pivot rod 251 extending through suitable apertures 252 in the side rails of the frame. It will thus be seen that rotation of said shaft 240 acts through the ratchet wheels 242 and rods 243 to transmit a shaking or vibrating motion to the forward end of said frame, with the result of shaking the carrier as it passes therethrough and the coated articles confined by the carrier, thus relieving said articles of any excess of coating that tends to adhere thereto. It will be observed that the amplitude of swing of the frame is short, thus presenting no impedance to the passage of the carrier therethrough. The shaft 240 is herein shown as driven by means of a chain 254 trained about a pulley 255 on the shaft and a pulley 124$^a$ on the countershaft 124 at the feed end of the machine (Figs. 1 and 3). The said lugs 244 of the shaking frame have guiding engagement with upright grooves in standards 255 (Figs. 13 and 14) attached to and rising from the side rails 50 of the frame. The said guide grooves for the lugs 244 will be slightly inclined to correspond with the arc of swinging movement of the frame and the shaker rods 243 may be jointed, as shown at 243$^a$, to avoid tendency of the parts to bind.

When it is desired to operate the machine without vibrating the frame for the purpose set forth, the forward end of the frame is raised from its normal position by means of a lever 256 (Figs. 13 and 14) which is locked in a position to hold the forward end of the frame up by means of a loop latch 257. When the frame is thus locked in its uppermost position, the shaker rods 243 are lifted out of position for contact with the ratchet wheels 242.

As a further means of removing excess coating material that may adhere to the articles as they emerge from the bath, I have provided a knocking device located just in rear of the vibrating frame, just described, which is made as follows: 260 designates a rotative shaft that extends transversely across the lower lap of the upper belt and is mounted at its ends in forwardly directed arms 261 attached to the rear upright posts 52. Fixed to said shaft are a plurality of knocker arms 262 which are adapted to strike a plurality of striking plates 263 overlying the lower lap of the upper belt, as shown in Figs. 10 and 11. As herein shown, said striking plates are attached to the rear end of the shaking frame and lie flat upon the said lower lap of the upper belt. The knocker arm shaft is rotated through the medium of a sprocket chain 264 (Fig. 1) trained about sprocket wheels 265 on said shaft and a sprocket wheel 266 on the shaft 74 which carries the rear supporting sprockets for the upper belt of the carrier. It will be observed that rotation of said shaft 266 causes said knocker arms to sharply strike said striking plates and that the force of such blows is transmitted to the adjacent laps of both carrier belts, thereby effecting dislodgment of objectionable or excess amount of the coating material. I have also provided means for removing excess coating material from the articles by the use of a blast of air directed upon the articles after they leave the bath. In order that the air shall not have the effect of chilling or setting the coating material when so directed upon said articles, the air is heated to the approximate temperature of the air within the inclosure. The heated air thus directed in the form of a blast upon the coated articles may be taken from the inclosure itself, which inclosure is suitably heated to maintain a desired and equable temperature around the coated articles from the time they leave the bath until they are ready to be discharged from the inclosure. I have shown an approved means for accomplishing this result which is made as follows: 280 (Figs. 1, 2 and 12) designates a pipe connected with the discharge end of a blower 281 mounted on the housing which incloses the central part of the machine. Said pipe 280 extends downwardly into the interior of the housing, and is connected with two branch pipes 282 (Fig. 12) within the housing which extends downwardly, one on each side of the housing, and communicate with the opposite ends of a distributing head 283 which is located between the upper and lower laps of the upper carrier belt. The said distributing head is provided in its lower wall by a plurality of openings which are controlled by dampers 284. Said dampers are herein shown as made of the sliding type but may be of any other suitable form by which the discharge of air from the head may be controlled at will. In the present instance, the blower 281 receives heated air from the interior of the housing through the medium of a pipe 285 communicating with the intake side of the blower and the interior of the housing (Figs. 2 and 24). The air is heated in said housing by means of a steam coil 286 supported on a hanger 287 from the top wall of the housing, and said coil receives steam from the main steam supply pipe 66ª (Figs. 1 and 2) that conveys steam to the coil in the bath reservoir jacket. It will be obvious that the housing which incloses the top of the bath reservoir and the carrier enables said parts to be maintained at an equable and uniform temperature without danger of sudden variations of temperature by reason of drafts. Such temperature may be readily regulated by the admission of more or less steam to the coil 286 within the housing.

270 designates a take-off belt, located at the discharge end of the machine, which receives the coated articles as they are discharged from the separating laps of the upper and lower carrier belts. Said take-off belt is trained about front and rear rollers 271, 272, respectively, (Figs. 1, 10 and 11) mounted in and extending transversely across the machine frame. The rearmost roller, shown in Fig. 1ª, constitutes the driving roller and is driven from a shaft 78, carrying the driving wheels for the lower carrier belt at the rear or discharge end of the machine, by means of a sprocket chain or belt 273 (Fig. 1) trained about sprocket wheels on said shaft 78 and the shaft 274 carrying the rear take-off belt roller 272. The coated articles are removed from the upper lap of the lower carrier belt, just before said belt returns about said sprocket wheels 76, over a stripper plate 275 lying flat on said upper lap and overlapping at its rear edge the take-off belt. Said stripper plate is made thin at its forward edge, thereby facilitating the transfer of the coated articles from the belt to the plate. It will be observed, by reference to Fig. 10, that the baskets 102 of the carrier belt are engaged with the coated articles until the latter are moved thereby across the stripper plate, whereby said articles are delivered upon the take-off belt in rows spaced the same distance apart, as when traveling through the bath. The said stripper plate is provided with a plurality of guide ribs 276 rising therefrom, forming between the same spaces located in line with the lines of baskets of the carrier (Fig. 11) whereby the coated articles are delivered upon the take-off belt in the same relative positions that they pass through the bath. The take-off belt is shown as equipped with hooks 270ª by which paper of suitable weight laid flat on the belt, may be attached thereto, whereby the coated articles may be delivered directly upon said paper and be thereby removed from the belt, as best shown in Figs. 36 and 37. The said stripper plate 275 is mounted on a bar 278 supported on the machine frame above the rear upturned end of a plate that constitutes a runway 279 through which the lower lap of the carrier is returned to the bath receptacle.

The runway 279, through which the lower lap of the lower carrier belt is returned to the bath reservoir, inclines toward the reservoir to direct the liquid coating material dripping therein back to the reservoir. Furthermore, the said lower lap of the belt drags against the bottom of said runway so as to scrape the coating material back to the reservoir. In order to allow the rods of said carrier to lie flat on the bottom of the runway, the bottom of said runway at the sides and center thereof is provided with grooves 288 (Fig. 10ª) which receive the driving or sprocket chains of said belt.

It will be observed, by reference to Fig. 4, that the members of the carrier are so arranged as to agitate the material of the coating bath, thereby avoiding the settling of the solid parts of the coating material on the bottom of the reservoir and insuring a uniform consistency of said coating material. The lower lap of the lower member of the carrier drags against the bottom of the bath tank at the lowermost portion thereof and serves to dislodge any sediment that gravitates towards and lodges on said lowermost part of the tank bottom. In practice it will be sometimes advisable to carry the lower lap of said lower carrier member closely adjacent to the tank bottom throughout the principal part of the length of said bottom.

Devices are provided for cleaning the carrier belts and the parts thereof which pass outwardly from the bath reservoir in either direction of the liquid coating which tends to adhere thereto. The means herein shown for effecting this result comprises brushes 290, 291, 292, the former engaging the inner face of the upper lap of the lower belt, and the two latter engaging both the upper and lower faces of the lower lap of said belt near the front end of the bath reservoir. The rotary brush 290 is rotatively mounted in the side walls of the bath receptacle and is rotated from the adjacent idler 93 on the shaft 93ª by means of a sprocket chain 294 that is trained about a sprocket wheel on the shaft 93 of said brush and a sprocket wheel 296 integral with the hub of said idler 293, as most clearly shown in Fig. 8. The rotary brush 291 is likewise rotated from the lower lap of the lower carrier belt through the medium of a sprocket chain 297 trained about a sprocket wheel on the shaft 298 of the brush 291 and a sprocket wheel 299 made integral with a second sprocket wheel 300 mounted on a shaft 301 and meshing with one of the side sprocket chains of the lower belt (Fig. 7). Similarly, the rotary brush 292 is driven from the lower lap of the lower carrier belt by means of a sprocket chain 302 trained about the shaft 303 of said brush and a sprocket wheel 304 made integral with a sprocket wheel 305 meshing with the adjacent driving or sprocket belt of the said lower belt and mounted on a short shaft 306 (Fig. 6).

The bath receptacle 60 is so mounted and supported that it may be lowered relatively to the horizontal rails 50 of the machine frame so as to afford access to the interior of the reservoir, when so lowered, through the space between said rails and the top of the lowered receptacle. In the present instance the runway 279, through which the lower lap of the lower carrier belt is returned to the bath reservoir, is fixed rigidly to said reservoir and is lowered and raised with the receptacle. The means herein shown for supporting said parts, permitting them to be thus raised and lowered, are shown in Figs. 1, 2 and 16, and are made as follows: 310, 310 designate a plurality of vertical standards attached at their upper ends to the reservoir and runway. There are three of said standards on each side of the machine, one set of three being shown in Fig. 2. Said standards are provided with teeth or cogs which engage a system of pinions 311 fixed to horizontal shafts 312 extending transversely across the machine and rotatively mounted in suitable bearings carried by the machine frame. The said pinions and shafts are adapted to be rotated in unison through the agency of sprocket chains 313 trained over sprocket wheels 314 on said shafts, one of which said chains is shown in Fig. 2. A single crank 315 is fixed to one of said shafts 312, the rearmost shaft as herein shown and operates through said sprocket chains and shafts to simultaneously rotate all of said sprocket wheels and thereby simultaneously raise both ends of said vertically movable structure. Said latter shaft is provided with a ratchet wheel 316 (Fig. 16) that is engaged by a holding pawl 317 that locks said raising and lowering gears in place.

In the operation of the machine the articles to be coated are delivered either by hand or by automatic mechanism to the upper lap of the intermittently advancing feed belt 140. Said articles are by said belt deposited upon the upper face of the lift bar 173 which at the proper period is raised to the level of the bridge plate 180 and the horizontal receiving portion of the lower carrier belt. When said articles are so raised by the lift-bar they are transferred by the pusher 195 across said bridge plate 180 to the horizontal receiving portion of the lower carrier belt. The row of articles thus delivered transversely across the lower carrier belt are advanced by said belt and as they reach the rear side of said horizontal portion of the belt they are confined upon the lower belt by the closing of the baskets 102 of the upper belt down over the same. The articles thus confined are advanced through the bath reservoir where they receive a layer of coating material, and thence through the shaking frame 88 and under warm air blast and the knocking device which operate to remove any excess of said coating material from said articles. There-after the coated articles are delivered to the take-off belt, either directly upon the belt or upon the paper attached to the belt. It is observed, therefore, that the handling of the articles from the time they are delivered to the machine to the time they are discharged therefrom is entirely automatic. Furthermore, the articles are so handled that they are carried through the machine and discharged therefrom in an orderly manner and are kept separate one from the other, thus avoiding the coating of said articles being marred by reason of the articles rubbing one upon the other. A further advantage of the mode of handling said articles is that the position thereof may be maintained throughout the entire operation, a feature of considerable importance in a machine for handling small and relatively unstable articles, such as cream centers of chocolate candy. When operating on articles to be coated not requiring such delicate handling as is required for cream centers of chocolate candy, the manner of feeding the articles to the carrier as well as the construction of the carrier may be varied. Moreover, the feeding mechanism may be varied in its construction, while adapting it to deliver the articles in a more or less uniform order on the carrier. Thus it will be observed that the feed belt and carrier in the construction shown, are advanced by movements of different characters, one an intermittent and the other a continuous movement. For some classes of work the relative movement of the feed belt and carrier may be varied, as for instance, the feed belt may not entirely stop its motion but proceed under less speed than as herein described. A further and important advantage of the use of the machine is the great capacity of its output, while at the same time maintaining the articles at all times in position for individual treatment and handling.

The construction herein shown as embodying an approved form of my invention has been described more or less minutely with respect to its structural details, but it is to be understood that many of the details are susceptible to variations in construction as well as to the manner and relation of their uses within the scope of my invention.

I claim as my invention:—

1. In a coating machine, a carrier comprising upper and lower endless belts and advancing and guiding means therefor, said belts traveling with two of their laps parallel with each other, the lower belt being provided in advance of said parallel portions with a flat receiving portion and the upper belt being provided with means for confining the articles on the lower belt, automatic means for feeding the articles to be coated upon said receiving portion, and means for applying coating material to said articles while confined on said lower belt.

2. In a coating machine, a carrier comprising upper and lower endless belts and advancing and guiding means therefor, said belts traveling with two of their laps parallel with each other, the lower belt being provided in advance of said parallel portions with a flat receiving portion and the upper belt being provided with means for confining the articles on the lower belt, automatic means for feeding the articles to be coated upon said receiving portion, means for applying coating material to said articles while confined on said lower belt, and automatic means for removing the coated articles from the carrier.

3. In a coating machine, a carrier comprising two endless belts and advancing and guiding means therefor, said belts traveling with two of their laps parallel with each other, one of said belts being provided with baskets which open on the front face of the belt and extend rearwardly therefrom and the adjacent lap of the other belt fitting flat on said front face to close the mouths of said baskets.

4. In a coating machine, a carrier comprising two endless belts and advancing and guiding means therefor, said belts traveling with two of the laps thereof flat together and parallel with each other and being provided with pockets arranged in transverse rows across one of the belts and extending rearwardly therefrom and opening towards the adjacent lap of the other belt, for the purpose set forth.

5. In a coating machine, a carrier comprising upper and lower endless belts and advancing and guiding means therefor, said belts traveling with their adjacent laps parallel with each other, and being provided with pockets arranged in transverse rows across the upper belt, which extend rearwardly therefrom and open toward the associated lap of the lower belt, said lower belt being arranged to provide in front of the line where said belts are brought together a horizontal receiving portion, and said belts being so arranged that the lower lap of the upper belt converges toward and travels flat against the adjacent lap of the lower belt.

6. In a coating machine, a dipping carrier comprising two endless upper and lower belts traveling with two of their laps parallel with each other, and supporting a guiding means therefor, the lower belt comprising a plurality of closely spaced parallel, transverse rods, and the upper belt being provided with a plurality of transversely disposed baskets which extend rearwardly therefrom and open towards the adjacent lap of the lower belt.

7. In a coating machine, the combination with a bath reservoir, of a carrier comprising upper and lower belts and advancing and guiding means therefor, said belts traveling through the reservoir with their adjacent laps parallel with each other, the upper belt being formed with a plurality of baskets which open toward the lower belt in the parts thereof which travel parallel with said lower belt, and the lower belt being provided with a substantially horizontal receiving portion, for the purpose set forth.

8. In a coating machine, the combination with a bath reservoir, of a carrier traveling therethrough comprising upper and lower belts which travel with their adjacent laps parallel with each other, the upper belt being formed to provide a plurality of baskets which open toward the lower belt in the parts thereof which travel parallel with said lower belt, the lower belt presenting a horizontal portion at the receiving end of the machine, and automatic means for feeding articles to the horizontal receiving portion of the lower belt.

9. In a coating machine, the combination with a bath reservoir, of a carrier arranged to provide a horizontal, upwardly facing receiving surface, means for automatically feeding articles upon said receiving surface of the carrier, automatic means for confining said articles on the carrier while passing through the bath reservoir comprising a part which travels through the reservoir parallel with said carrier and formed to provide pockets which are applied over said articles at the receiving end of the machine and are moved away from the carrier at the discharge end of the machine.

10. In a coating machine, the combination with a bath reservoir, of a traveling carrier comprising upper and lower belts which travel through said reservoir and a distance in rear thereof with their adjacent laps parallel with each other, the lower belt being arranged in advance of the reservoir with a horizontal portion to receive the articles to be coated and the upper belt being provided with a plurality of baskets which open toward the lower belt in the part thereof which travels parallel with the lower belt, and an automatic take-off device located at the point of separation of the upper and lower belts.

11. In a coating machine, the combination with a bath reservoir, of a traveling carrier comprising upper and lower belts which travel through said reservoir and a distance in rear thereof with their adjacent laps parallel with each other, the lower belt being arranged in advance of the reservoir with a horizontal portion to receive the articles to be coated and the upper belt being provided with a plurality of baskets which open toward the lower belt in the part thereof which travels parallel with the lower belt, an automatic take-off device located at the point of separation of the upper and lower belts, and means acting on said articles after they emerge from the reservoir and while confined by said baskets on the lower belt to dislodge excess coating material therefrom.

12. In a coating machine, the combination with a bath reservoir, of a carrier traveling through the reservoir, means for confining the articles on the carrier while passing through the reservoir, a pivoted shaking frame through which said carrier passes as it emerges from the reservoir, and means for shaking said frame.

13. In a coating machine, the combination with a bath reservoir, of a carrier traveling through the reservoir, means for confining the articles on the carrier while passing through the reservoir, a pivoted shaking frame through which said carrier passes as it emerges from the reservoir, and means for shaking said frame comprising a rotating ratchet wheel, a reciprocating rod engaging at one end the movable part of said frame and engaging and actuated at its other end by said ratchet wheel.

14. In a coating machine, the combination with a bath reservoir, of a carrier traveling through the reservoir, means for confining the articles on the carrier while passing through the reservoir, a shaking frame through which said carrier passes as it emerges from the reservoir, means for shaking said frame, and means for disconnecting said shaking frame from its actuating mechanism and locking it in its disconnected position.

15. In a coating machine, the combination with a bath reservoir, of a carrier traveling therethrough embracing two endless belts which travel with two of their laps parallel with each other, one of said belts being provided with pockets which open towards the adjacent lap of the other belt in the parts thereof which travel together, a shaking frame located in rear of said reservoir, having guide grooves through which pass the marginal parts of the parallel portions of the belts, whereby said belts are held together, and means for shaking said frame.

16. In a coating machine, the combination with a bath reservoir, of a carrier traveling through the reservoir, means for confining the articles on the carrier while passing through the reservoir, and a knocking device operating against the carrier after it emerges from the reservoir, comprising a rotative shaft extending transversely across said carrier, and a plurality of knocker arms fixed to said shafts.

17. In a coating machine, the combination with a bath reservoir, of a carrier traveling through the reservoir, means for confining the articles on the carrier while passing through the reservoir, and a knocking device operating against the carrier after it emerges from the reservoir, comprising a rotative shaft extending transversely across the carrier, and a plurality of knocker arms fixed to said shaft and striking plates lying over said belt against which said knocker arms act.

18. In a coating machine, the combination with a bath reservoir, of a carrier traveling through the reservoir, means for confining the articles on the carrier while passing through the reservoir, means for shaking said carrier after it emerges from the reservoir, and a knocking device operating on said carrier between said shaking device and the discharge end of the machine.

19. In a coating machine, the combination with a bath reservoir, of a carrier traveling therethrough, means for confining the articles on said carrier, means for directing an air blast on said coated articles to dislodge excess coating material therefrom, and means for heating the air blast.

20. In a coating machine, the combination with a reservoir, of a carrier traveling therethrough, means for confining thereon the articles to be coated, a housing inclosing said carrier and the upper side of said reservoir, means for heating the interior of said housing or inclosure, and means for directing the heated air from said inclosure in the form of a blast upon the articles as they emerge from the bath, for the purpose set forth.

21. In a coating machine, the combination with a traveling carrier, means for confining thereon the articles to be coated, and means for applying coating material to said articles on the carrier and during the movement of the latter, of automatic means located at the receiving side of the machine for feeding the articles to said traveling carrier, constructed to space said articles at predetermined distances apart to correspond with the confining means.

22. In a coating machine, the combination with an endless traveling carrier, means for confining thereon the articles to be coated, and means for applying the coating material to said articles on the carrier and during the movement of the latter, of mechanism for feeding the articles to said carrier comprising a feed belt, and automatic means for transferring the articles from the feed belt to the carrier.

23. In a coating machine, the combination with a traveling carrier, means for confining thereon the articles to be coated and means for applying the coating material to the articles confined on the carrier, of mechanism for feeding the articles to the continuously traveling carrier, comprising a feed belt, a stop between the feed belt and carrier, and means operating to transfer the articles arrested by the stop onto the carrier.

24. In a coating machine, the combination with a traveling carrier, means for confining the articles thereon to be coated, and means for applying the coating material to the articles on the carrier, of means for feeding the articles to said carrier comprising a feed belt, a stop between the feed belt and carrier, means for raising said articles above the level of said stop, and means for transferring the articles when raised to the carrier.

25. In a coating machine, the combination with a traveling carrier, means for confining thereon the articles to be coated, and means for applying the coating material to the articles on the carrier, of feeding mechanism for feeding the articles to the carrier, comprising a feed belt, a stop located between said carrier and belt, a lift bar located between the stop and the feed belt upon which said articles are delivered from the belt and by which the articles are raised above the level of the stop, and means for transferring the articles when so raised to the carrier.

26. In a coating machine, the combination with a traveling carrier, means for confining thereon the articles to be coated, and means for applying the coating material to said articles on the carrier, of mechanism for feeding said articles to the carrier comprising a feed belt, a stop located between the carrier and feed belt, a lift bar located between the stop and feed belt upon which the articles are delivered from said feed belt and by which they are raised above the level of said stop, and a horizontally reciprocating pusher for transferring said articles from the lift bar to said carrier.

27. In a coating machine, the combination with a traveling carrier, means for confining thereon the articles to be coated, and means for applying the coating material to said articles on the carrier, of mechanism for feeding the articles to the traveling carrier comprising a feed belt, a stop located between the carrier and feed belt, a lift bar located between said stop and feed belt with its upper surface in the plane of said belt, means for raising and lowering said lift bar, means for transferring the articles from the lift bar when occupying its upper position to the carrier, and means located between the feed belt and lift bar for directing the articles from said belt to the lift bar.

28. In a coating machine, the combination with a traveling carrier, means for confining thereon the articles to be coated, and means for applying the coating material to the articles confined on the carrier, of mechanism for feeding the articles to the traveling carrier comprising a feed belt, a stop between the feed belt and carrier, a plurality of horizontal rotative rollers interposed between said feed belt and stop, and means operating to transfer the articles arrested by the stop onto the carrier.

29. In a coating machine, the combination with a traveling carrier, means for confining thereon the articles to be coated, and means for applying the coating material to the articles on the carrier, of mechanism for feeding the articles to the traveling carrier comprising a feed belt, a stop located between the carrier and feed belt, a lift bar located between said stop and feed belt with its upper surface in the plane of said belt, means for raising and lowering said lift bar, means for transferring the articles from the lift bar when occupying its upper position to the carrier, and a plurality of horizontal, rotating rollers located between the feed belt and lift bar for directing the articles from said belt to the lift bar.

30. In a coating machine, the combination with a traveling carrier, means for confining thereon the articles to be coated, and means for applying the coating material to said articles on the carrier, of mechanism for feeding the articles to said carrier comprising a feed belt, a stop located between said carrier and feed belt against which said articles from the belt are carried, mechanism for automatically transferring said articles from the position in which they are arrested by the stop to said carrier, and a plurality of horizontal rollers located between said stop and feed belt substantially in the plane of said belt, for the purpose set forth.

31. In a coating machine, the combination with a traveling carrier formed to provide means for confining thereon the articles to be coated, and means for applying the coating material to said articles on the carrier, of mechanism for feeding the articles to said carrier, embracing means for depositing the articles in transverse rows across the carrier.

32. In a coating machine, the combination with a traveling carrier formed to provide rows of baskets or pockets to receive and confine the articles to be coated, and means for applying the coating bath to said articles on the carrier, of mechanism for feeding the articles to said traveling carrier, comprising a feed belt, and means for automatically transferring the articles from said feed belt to the carrier, said feed mechanism being constructed and arranged to deposit the articles on the carrier in positions to correspond with the rows of pockets on the carrier.

33. In a coating machine, the combination with a traveling carrier formed to provide transverse and longitudinal rows of baskets or pockets to receive and confine the articles to be coated, and means for applying the coating bath to said articles on the carrier, of mechanism for feeding the articles to said traveling carrier, comprising a feed belt, means for transferring the articles from the feed belt to the carrier, and spacing bars located over said feed belt dividing the belt into parallel, laterally spaced areas located in line with the longitudinal rows of the baskets of the carrier.

34. In a coating machine, the combination with a bath reservoir, of a carrier traveling therethrough to submerge the articles to be coated in the coating bath, means for confining the articles on the carrier as they pass through said bath, a take-off device, and means for transferring said articles from said carrier to the take-off device, said carrier and take-off device being constructed and arranged to retain said articles upright on said take-off device during said transfer.

35. In a coating machine, the combination with a bath reservoir, of a carrier traveling therethrough comprising two endless belts and advancing and guiding means therefor, said belts traveling through the reservoir with two of the laps thereof parallel and together, the upper belt being provided with baskets which open toward the adjacent lap of the lower belt, to confine the articles on the lower belt of the carrier, said adjacent laps separating at the discharge end of the machine to release the articles from said baskets, and means automatically removing the coated articles from the carrier when so released from said baskets.

36. In a coating machine, the combination with a bath reservoir, of a carrier comprising upper and lower endless belts and advancing and guiding means therefor, said belts traveling with a portion of their adjacent laps parallel with each other, the lower belt being provided with a horizontal receiving portion and a horizontal discharge portion, and the upper belt being provided with a plurality of baskets which confine the articles on the associated lap of the lower belt, and a take-off belt located in the plane of the discharge end of the lower belt from which latter the coated articles are discharged upon the take-off belt.

37. In a coating machine, the combination with a bath reservoir, of a carrier comprising upper and lower endless belts, and advancing and guiding means, the adjacent laps of said belts traveling parallel with each other through said reservoir, the upper belt being formed to provide a plurality of baskets which open toward the adjacent or parallel lap of the other belt, and means located at a point where said belts separate to automatically remove the coated articles from the lower carrier belt.

38. In a coating machine, the combination with a bath reservoir, of a carrier comprising upper and lower belts having adjacent, parallel laps which travel through said reservoir, the upper belt being formed to provide a plurality of baskets which open toward the adjacent or parallel lap of the lower belt, and a stripper located over the lower carrier belt for stripping said coated articles from the lower belt.

39. In a coating machine, the combination with a bath reservoir, of a carrier comprising upper and lower belts having adjacent, parallel laps which travel through said reservoir and between which the articles to be coated are confined, and a take-off device located in rear of the carrier, the upper carrier belt operating at a point where it diverges from the lower belt to carry the coated articles from the lower belt to the take-off device.

40. In a coating machine, the combination with a bath reservoir, of a carrier comprising upper and lower belts having adjacent, parallel laps which travel through said reservoir and constructed to provide baskets in which the articles to be coated are confined, and a take-off device located in rear of the carrier, the upper carrier belt operating at a point where it diverges from the lower belt to carry the coated articles from the lower belt to the take-off device.

41. In a coating machine, the combination with a bath reservoir, of a carrier comprising upper and lower belts having adjacent, parallel laps which travel through the reservoir, the upper belt being formed to provide a plurality of baskets which open toward the adjacent lap of the lower belt in their parts which travel together, and a take-off device in rear of said carrier, said pockets of the upper belt engaging the coated articles in such manner as to transfer the coated articles from the lower belt to the take-off device.

42. In a coating machine, the combination with a bath reservoir, of a carrier comprising upper and lower belts having adjacent, parallel laps which travel through the reservoir, and formed to provide means by which are confined the articles to be coated, and a take-off device in rear of and at the level of the upper lap of the lower belt, the lower lap of the upper belt extending rearwardly beyond the lower belt and over said take-off device, and being arranged to transfer the coated articles from said lower belt to the take-off device.

43. In a coating machine, the combination with a bath reservoir, of a carrier comprising upper and lower belts having adjacent, parallel laps which travel through the reservoir, a take-off belt located in rear and in the substantial plane of the upper lap of the lower belt, and a stripper plate overlying and extending between said upper lap of the lower belt and the take-off belt, the lower lap of the upper belt extending rearwardly beyond the lower belt over said take-off belt, and having parts which engage said coated articles in a manner to transfer the same over said stripper plate to the take-off belt.

44. In a coating machine, the combination with a bath reservoir, of a carrier traveling therethrough, means for confining the articles on said carrier, and a take-off belt located at the rear end of the carrier in position to receive the coated articles from the carrier, said take-off belt being provided on its upper surface with means for detachably affixing a piece of paper thereto, for the purpose set forth.

45. In a coating machine, the combination with a reservoir, of a carrier traveling therethrough, means for confining thereon the articles to be coated, a housing inclosing said carrier and the upper side of said reservoir, and means for directing a blast of heated air upon the coated articles after they emerge from the reservoir.

46. In a coating machine, the combination with a reservoir, of a carrier comprising two endless belts, advancing and guiding means therefor, said belts traveling with two of the laps thereof parallel with each other and with the lower lap of the lower belt traveling adjacent to the bottom of the reservoir, for the purpose set forth.

47. In a coating machine, the combination with a reservoir, of an endless carrier traveling through the reservoir, means for confining on the upper lap of the belt the articles to be coated, the lower lap of the carrier being directed through said reservoir and a runway beneath that part of the carrier between the reservoir and the discharge end of the machine, said lower lap of the carrier being carried forwardly on the bottom of said runway for the purpose of directing back to the reservoir coating material which drips into the runway.

48. In a coating machine, the combination with a bath reservoir, of an endless carrier traveling therethrough, means for confining on the upper lap of said carrier the articles to be coated, the lower lap of said carrier being returned through said reservoir, and means for removing the coating material adhering to the carrier as it emerges from the bath.

49. In a coating machine, the combination with a bath reservoir, of an endless carrier traveling therethrough, means for confining on the upper lap of said carrier the articles to be coated, the lower lap of the said carrier being returned through said reservoir, and a brush engaging the carrier as it emerges from the bath, for the purpose set forth.

50. In a coating machine, the combination with a bath reservoir, a housing which incloses the top of the reservoir, a frame for supporting said housing and reservoir, and a carrier traveling through said reservoir, of means for lowering said reservoir to render the same accessible from above for cleansing and other purposes.

51. In a coating machine, the combination with a traveling carrier and means for applying a coating material to the articles on said carrier, of a feeding machine comprising a feed belt, means for transferring the articles from the belt to the carrier, spacing bars located over the feed belt dividing the belt into laterally spaced areas, and means located at the forward ends of said spacing bars for directing the articles to the spaces between the bars.

52. In a coating machine, the combination with a traveling carrier and means for applying a coating material to the articles on said carrier, of a feeding machine comprising a feed belt, means for transferring the articles from the belt to the carrier, spacing bars located over the feed belt dividing the belt into laterally spaced areas, and transversely movable devices at the forward ends of the spacing bars, for directing the articles to the spaces between the bars.

In testimony, that I claim the foregoing as my invention I affix my signature in the presence of two witnesses, this 21st day of June, A. D. 1907.

RALPH R. RICHARDSON.

Witnesses:
H. J. BROWN,
F. B. DAVIDSON.